United States Patent

Waltz et al.

[11] Patent Number: 5,902,004
[45] Date of Patent: May 11, 1999

[54] MOTOR VEHICLE DOOR

[75] Inventors: Uwe Waltz; Manfred Stenzel, both of Bamberg, Germany

[73] Assignee: Brose Fahrzeugteille GmbH & Co. KG, Coburg, Coburg, Germany

[21] Appl. No.: 08/869,266

[22] Filed: Jun. 4, 1997

[30] Foreign Application Priority Data

Jun. 4, 1996 [DE] Germany ............... 196 22 310

[51] Int. Cl.⁶ ............................................. B62D 25/00
[52] U.S. Cl. ............................................. 296/146.9; 49/503
[58] Field of Search ........................... 296/146.5, 146.9, 296/39.1; 49/503

[56] References Cited

U.S. PATENT DOCUMENTS 5,308,129  5/1994  Hlavaty ................................ 292/216
5,405,672  4/1995  Takiguchi et al. ............... 296/146.9 X
5,588,260  12/1996  Suzuki et al. .................... 296/146.5 X

FOREIGN PATENT DOCUMENTS 209052  9/1983  Germany .
928685  8/1989  Germany .
026217  2/1992  Germany .

*Primary Examiner*—Joseph D. Pape
*Attorney, Agent, or Firm*—Christie, Parker & Hale, LLP

[57] ABSTRACT

A motor vehicle door including a simple latch assembly comprising a preassembled and easily inspectable functional module and a moisture barrier which separates a dry zone sealed from external moisture and an unsealed wet zone. The latch lies completely within the dry zone. The latch is preassembled on the side of a mounting plate facing an inside door panel and includes a sealing element which seals at least a portion of the latch area against moisture.

21 Claims, 4 Drawing Sheets

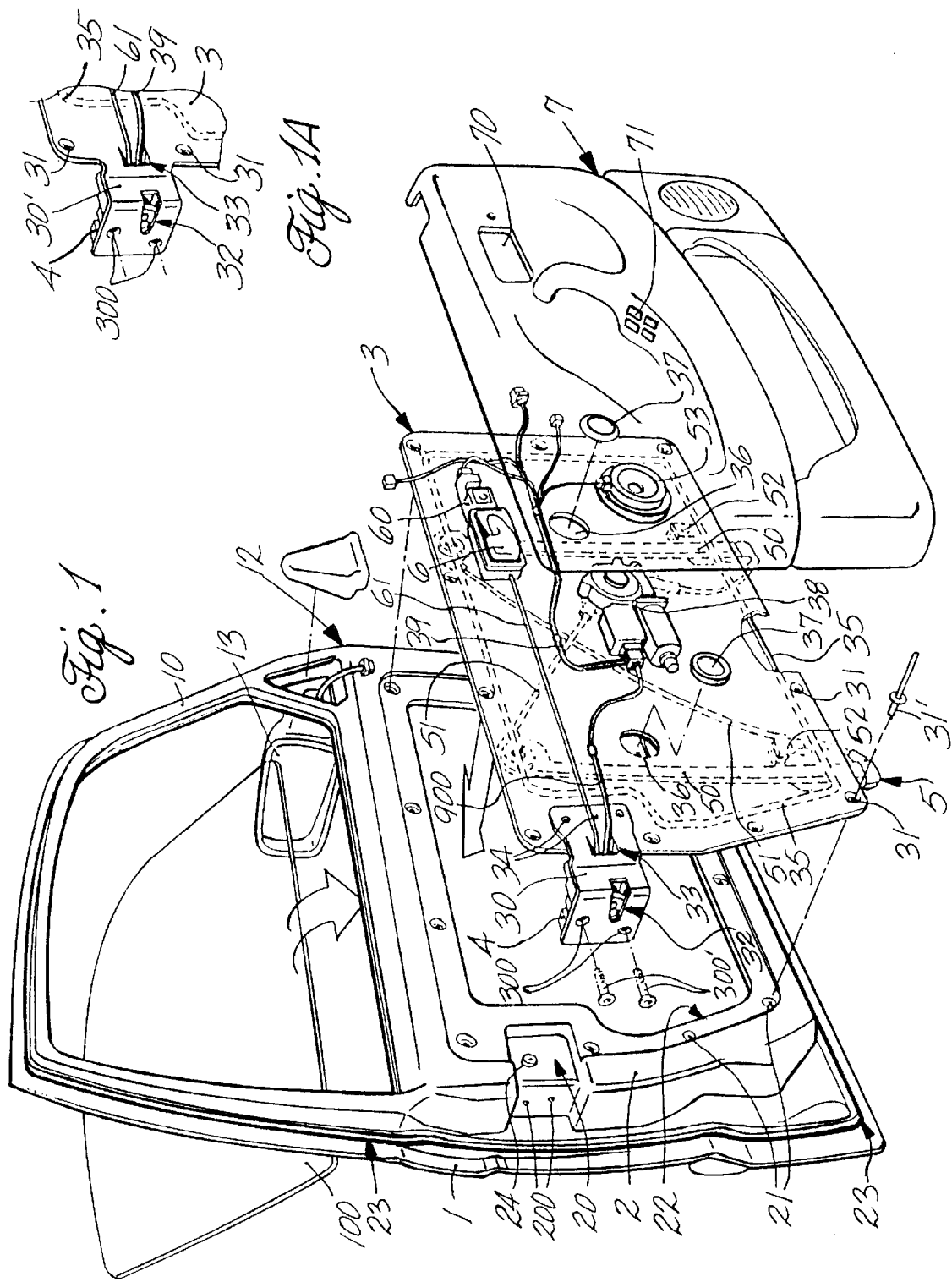

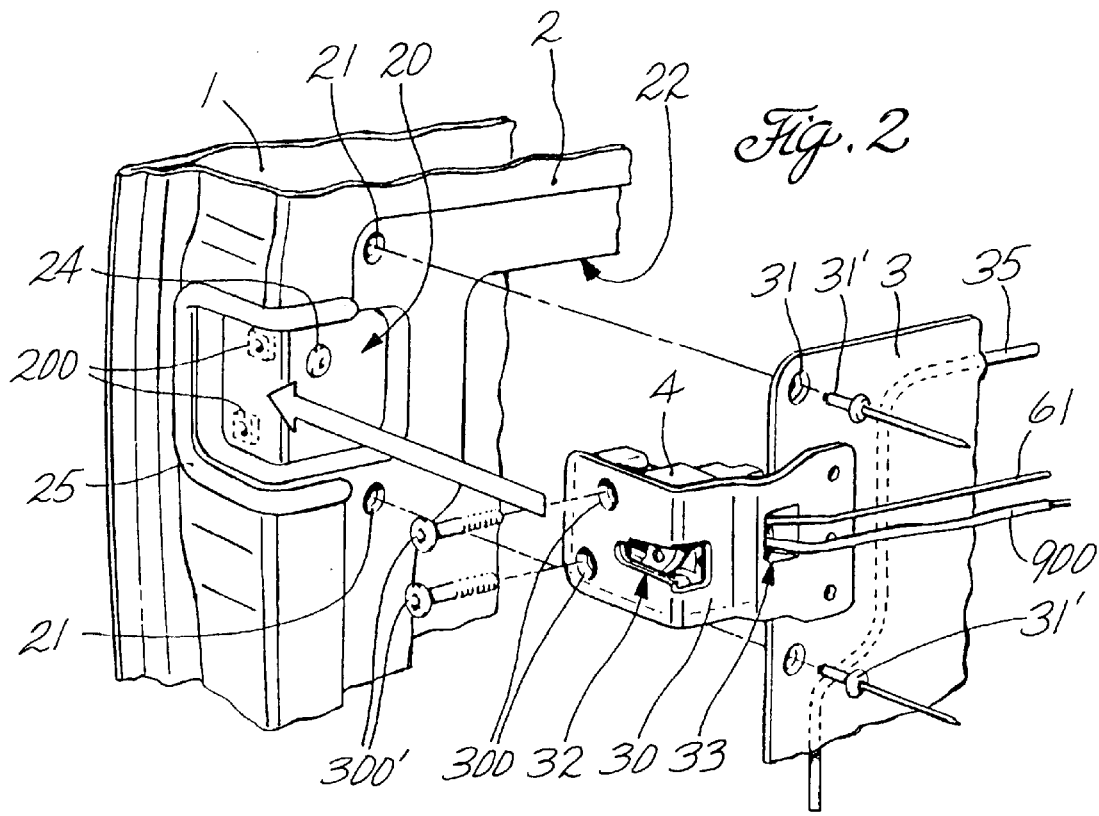
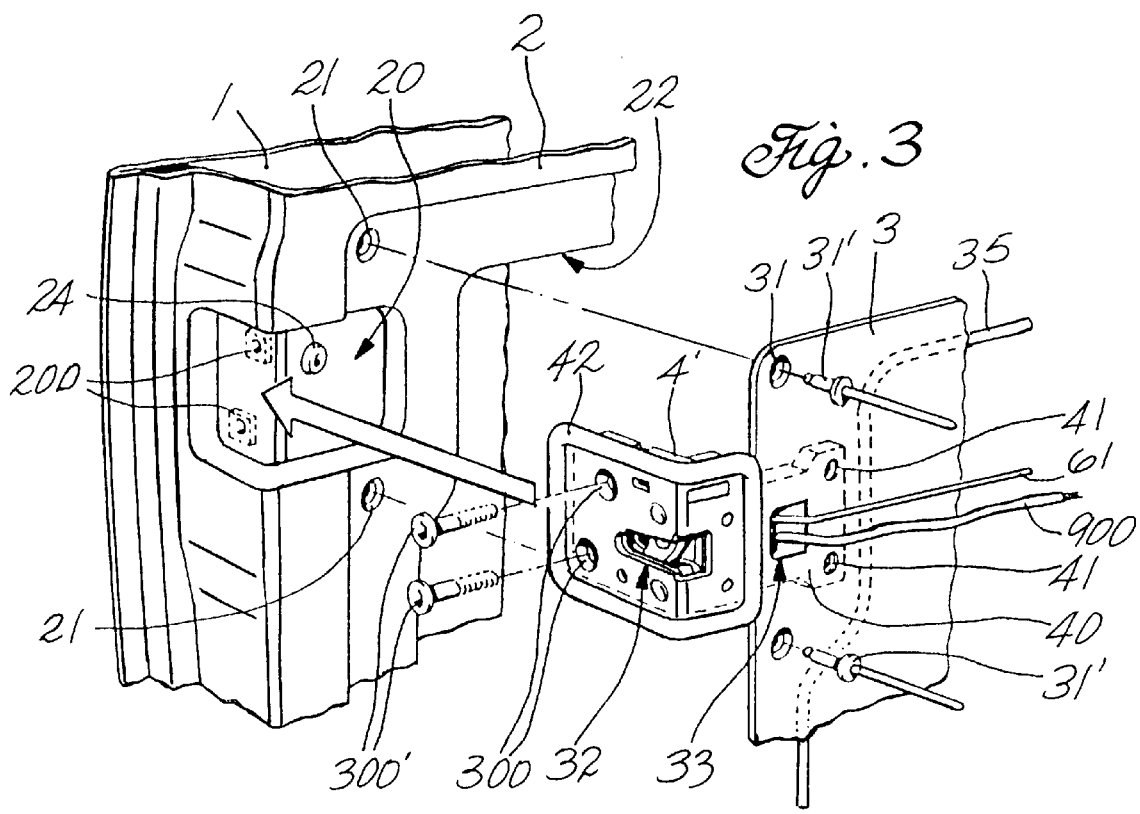

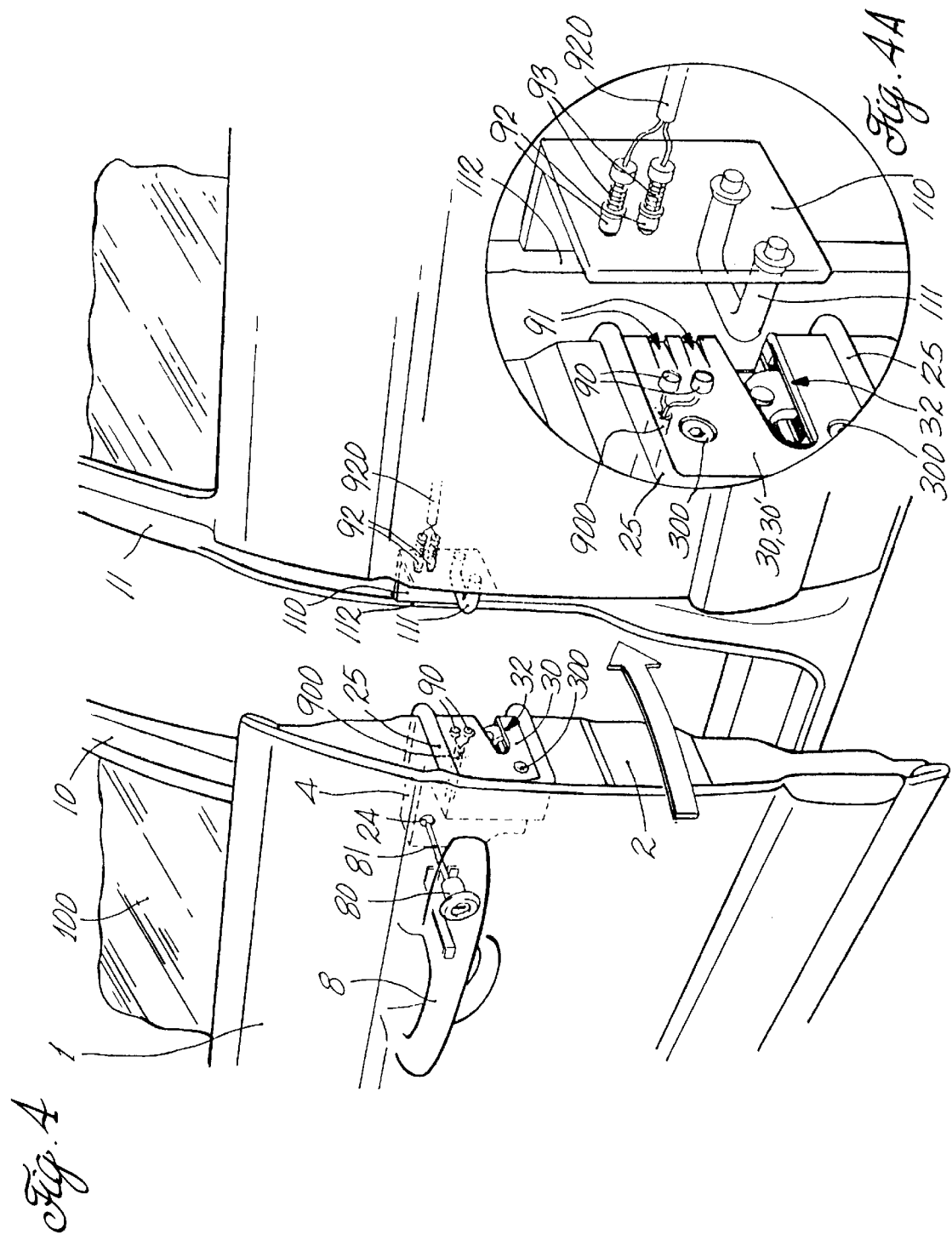

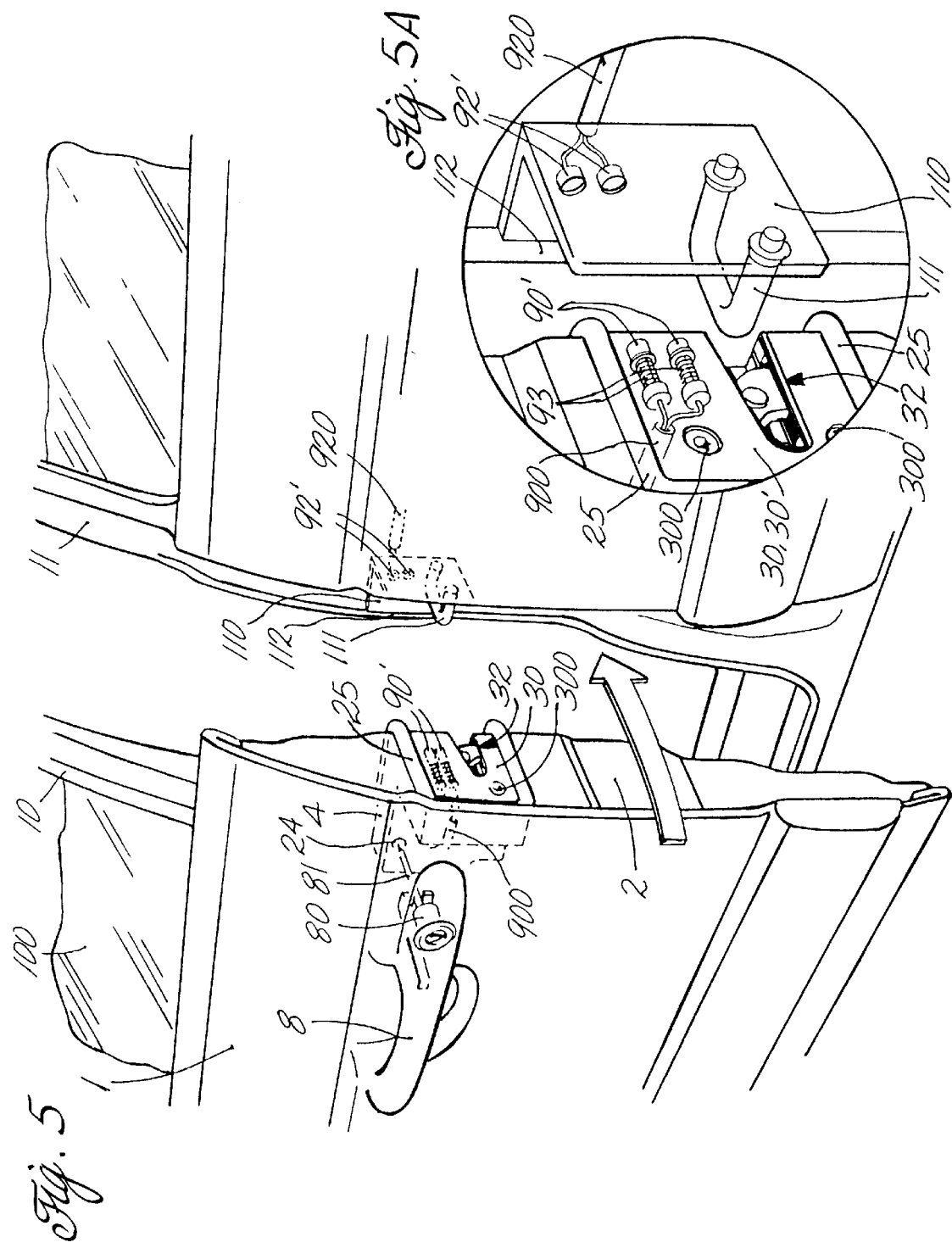

MOTOR VEHICLE DOOR

BACKGROUND OF THE INVENTION

The invention relates to a motor vehicle door, and more particularly to a door which includes a simple latch assembly comprising a preassembled and inspectable functional module and a moisture barrier which separates a zone sealed from moisture, or dry zone, and an unsealed, or wet zone, wherein the latch lies completely within the dry zone.

German Patent No. 40 26 217 A1 discloses a motor vehicle door with an outside door panel and a completely closed inside door panel on which components are mounted. It is proposed to provide corrugations and indentations in the inside door panel which can accommodate components, such as inside door control, latching, and central locking mechanisms, as well as the conductors and linkages connected thereto.

With this arrangement, openings through the inside door panel from the wet zone into the dry zone are avoided and a reinforcement of the door body are supposed to be obtained. An inner door lining covers the beads and indentations with the components contained therein.

The window frame is set in the dry zone of the door body from above and bolted to it with its essentially vertical window frame mounting uprights. An electrical window lifter is also attached to these uprights.

This solution has the disadvantage that the latch disposed outside the body of the door must be designed very stable, and reinforcement measures must be provided in the region of its attachment to the inside door panel in order to obtain adequate resistance to it being ripped out. An economical dry zone design of the latch also cannot be used since the engagement region of the latch into which a locking element on the vehicle body engages is located in the wet zone.

U.S. Pat. No. 5,308,129 discloses a mounting plate with a window lifter, a control handle, and a latch, which is attached to a plastic mount moveably mounted on the mounting plate. On one side surface of the mounting plate, the latch is connected first by means of simple snap connections and then connected via a control link with the control handle. This is supposed to simplify preassembly and transportation. In the assembly of the door, separate attachment points are provided between the mounting plate and the door as well as between the latch and the door.

The design principle described provides for inserting the preassembled mounting plate in the wet zone, formed by the outside door panel and the inside door panel, in order to be able to ensure high resistance of the latch to being ripped out. Thus, all components must be used in the expensive wet zone design, or separate moisture protection measures must be taken.

SUMMARY OF THE INVENTION

According to one embodiment of the invention, a simple to assemble motor vehicle door is provided which has a mounting plate with preassembled functional units, and which enables a dry zone design of the latch with high resistance to being ripped out.

A preferred embodiment of the invention provides means which enable attaching the latch as a preassembled and preinspectable component on a mounting plate which simultaneously seals a cutout in the inside door panel and disposes the latch in a dry zone, that is, a portion of the door sealed from external moisture. In addition, the resistance of the latch to being ripped out, which is important in a crash, is even higher than that of latches installed in the wet zone of a conventional door.

According to one embodiment of the invention, a mounting plate is mounted between an inner panel of a door. A latch is preassembled on the side of the mounting plate facing the inside door panel, and the mounting plate extends into a latch zone of the door. Alternatively, the part which bears the latch is separate from the mounting plate and is solidly attached to the mounting plate, for example, by welding or bolting. Further embodiments include ripout-resistant connections between the mounting plate and the part bearing the latch to permit limited mobility of the part for the purpose of tolerance compensation during assembly.

Preferably, the edge of the mounting plate, or the separate part connected thereto, engages a front region of the latch by fastening bolts which are provided to connect the mounting plate and a mounting sheet in the latch area as well. Thus, a particularly high resistance to being torn out is obtained for the latch. Ideally, at least two fastening bolts pass through the latch body.

In order to be able to select an economical dry zone design of the latch, it is essential that the front side of the latch also be protected from moisture by a sealing element. For this, the sealing element must seal at least the immediate latch area. Preferably, the sealing element runs substantially along the contour of the latch or the contour of the latch mount. Preferably, the seal is positioned along the front end of the door and into the dry region, which runs between the door lining and the inside door panel or the mounting plate. If the sealing element is not closed all the way around, its ends are covered by a door flange seal on a column on the vehicle body adjacent the latch when the door is closed.

Additional possibilities for protection of the latch from moisture consist in the placement of the sealing element along the front side of the support sheet region bearing the latch, whereby the sealing element presses against an opposing front end of the door frame column in the vehicle body, also referred to as the B column, or placement of the sealing element along the contour of the outside panel of the door, whereby an uninterrupted seal is also provided relative to the B column.

In order to create adequately good dry zone conditions between the front side of the door and the B column, passage of water from the base of the door and from the roof of the vehicle must also be prevented. This may also be accomplished through a likewise good seal of said zones or through a sealed separation of the dry zone located between the front end of the door and the B column from the adjacent, not adequately dry areas.

In another embodiment, the mounting plate does not overlap the latch on its front end and the necessary sealing element is mounted directly on the front end of the latch. This is essential when a region of the latch extends beyond the front surface of the door. The above-described measures create an additional dry zone besides that between the door liner and the inside door panel. This additional dry zone seals at least a portion of the zone extending between the front of the door and the B column, including the engagement zone of the latch and an associated part of the lock on the B column. Thus, all sections of the latch are located in one of the two dry zones when the door is closed. Thus, a latch of a more economical dry zone design may be used.

In addition, this dry zone design also enables disposing electrical contacts in this zone, which contacts are provided for electrical energy and signal transmission to operate electrical units in the door. These contacts may be implemented as separate parts in proximity to the latch or as components of the locking arrangement itself. Waterspray protection in the form of a movable protective cover also protects the contacts from moisture when the door is open. When the door closes, the waterspray protection uncovers the contacts and, if appropriate, the lock parts are covered thereby.

DESCRIPTION OF THE DRAWINGS

These and other features of the invention will become apparent in the following detailed description of a presently preferred embodiment taken in conjunction with the accompanying drawings, wherein:

FIG. 1 is an exploded perspective view of the major components of a motor vehicle door according to one embodiment of the invention;

FIG. 1a is a perspective view of a mounting plate with a latch mount formed in one piece therewith;

FIG. 2 is an exploded perspective view of a motor vehicle door in the region of the latch and with a sealing element in this region on the inside door panel according to another embodiment;

FIG. 3 is analogous to FIG. 2, but with a sealing element in the latch region on the latch mount;

FIG. 4 is a perspective view of a motor vehicle body with electrical contacts in the latch region according to one embodiment;

FIG. 4a is an enlarged view of the latch region in FIG. 4;

FIG. 5 is a perspective view of a motor vehicle door with electrical contacts in the latch region according to another embodiment; and FIG. 5a is an enlarged view of the latch region in FIG. 5.

DETAILED DESCRIPTION OF THE INVENTION

FIG. 1 depicts the major components of a motor vehicle door according to a preferred embodiment of the invention immediately before assembly in the auto plant. These major components are a door body 12 comprising an outside door panel 1 and an inside door panel 2, a mounting plate 3 bearing a plurality of functional units 4, 5, 6, 38, 39, 53, to be described in detail below, and a door lining 7. Beyond that, only the window pane 100 and the door mirror 13 must be installed. The modular design of the vehicle door enables extensive preassembly of individual parts and assemblies as well as significantly improved ability to preinspect the functional groups present. These reduce the defect rate and assembly times.

The inside door panel 2 of the door body 12 has a large cutout 22, on the edge of which a plurality of fastening holes 21 are disposed. They correspond with fastening holes 31 on the periphery of the mounting plate 3, which is to be mounted by means of blind rivets 31' on the inside door panel 2. Alternatively, it is also possible to use bolts.

The door includes a region sealed from external moisture which is hereinafter referred to as a dry zone, and an unsealed region hereinafter referred to as a wet zone. Preferably, the mounting plate 3 separates the dry zone and the wet zone. To ensure reliable moisture protection of the dry zone of the door, located between the mounting plate 3 and the door lining 7, a surrounding seal 35 (shown in shadow) is disposed on the wet zone side of the mounting plate 3, which lies, after assembly, against the edge region of the cutout 22 of the inside door panel 2.

In the latch region of the door body 12, a stamped indentation 20 is provided in the inside door panel 2. The indentation 20 is directed into the cavity of the door and is shaped to accommodate the latch 4 as form-fittingly as possible.

In one embodiment, openings 24, 200 in the region of the stamped indentation 20 are provided for passage of a coupling element 81 between the outside door handle 8 and the latch 4 (see FIG. 4). The openings are sealed after door installation to protect the latch 4 from moisture.

To fully take advantage of the separation of the dry and wet zones by the mounting plate 3, as many components as possible are disposed on the dry zone side. In particular, it is preferable to mount the electrical components, such as a drive unit 38 (comprising the electric motor with gears and the electronics unit), an electrical switch 60 for mirror adjustment, a speaker 53, and a wiring harness 39, 900 on the dry zone side of the mounting plate 3. Designs of the functional assemblies suitable for mounting in the dry zone are significantly more economical than the more expensive wet zone designs. Only the guide rails 50 of the two-strand cable window lifter as well as the cable sling with a Bowden casing 51, which is essential for the transfer of force in the window lifter, are mounted on the wet zone side of the mounting plate 3. To connect a window pane 100 with the window lifter mechanism, carriers 52 mounted on the guide rails 50 are moved to the height of assembly openings 36 in the mounting plate 3. Upon completion of the assembly process, the openings 36 are sealed with covering caps 37 made of plastic or rubber.

The locking and unlocking system represents an essential functional assembly of the vehicle door. According to another embodiment of the invention, a latch 4 is preassembled on a latch mount 30, such that the latch mount 30 surrounds the latch 4 and thus forms part of the front side of the vehicle door. The latch mount 30 is a separate sheet-metal part, which is preferably solidly connected to the mounting plate 3. It has fastening holes 300, by means of which the latch can be connected solidly with the inside door panel 2 by means of screws 300' and the fastening points 200. The slot 32 enables engagement in the latch 4 of the locking element 111 mounted on the center pillar 11 of the door frame in the vehicle body. The center pillar 11 has a portion adjacent the front door, referred to as the B column, and a portion adjacent the rear door, referred to as the C column (see FIG. 4). Another opening 33 in the mount 30 is used for the passage of a linkage 61, which transfers the operating force of the handle 6 of the interior unlocking arrangement. Moreover, the electrical supply cable 900 may also be passed through it to supply the various electrical components in the vehicle door with electrical energy and signals, as described in connection with FIGS. 4 and 5 below.

According to another embodiment, the latch mount 30' is formed in one piece on the mounting plate 3, as depicted in FIG. 1a, and thus reduces the number of parts.

In order to be able to use the economical design of the latch 4, the latch zone lying in the front of the door must also be protected from moisture by a seal. According to the exemplary embodiment of FIG. 1, this is accomplished by means of the sealing element 23, which is attached peripherally on the door in proximity to the flanged seam of the outside door panel 1 and the inside door panel 2, and when the door is closed presses against the associated zones of the motor vehicle body. Thus, a dry zone is also formed between the front end of the door and the door frame column on the vehicle body (the B or the C column) such that the latch 4 is completely shielded from moisture.

The invention thus unites multiple advantages: In addition to the economical dry zone design of the latch 4, a significantly higher resistance to ripping out is achieved, which is essential to the dissipation of high crash forces. Moreover, the dry zone created according to the various embodiments of the invention, which surrounds at least the immediate region of the latch, makes it possible for electrical contact elements for the transmission of signals and/or electrical energy to be disposed in this zone.

FIG. 2 illustrates a variant of the invention which differs from that in FIG. 1 only through the replacement of the sealing element 23 with a sealing element 25. Sealing element 25 extends along the outer contour of the indentation 20, in the front surface region of the door as well as in the adjacent region on the interior side of the door until it reaches the outer edge of the sealing element 35 on the mounting plate 3. During installation, after the mounting plate 3, including the latch 4, has been positioned and mounted on the inside door panel 2, the mounting slot surrounding the edge of the latch mount 30 is sealed by the sealing element 25. When the door is closed, the sealing element 25 lies sealingly against the front side of the column 11 and the adjacent angled body surface. Thus, a very narrowly limited dry zone, which encloses only the latch area, is formed. The free ends of the sealing element 25 extend far enough that when the door is closed, the sealing element 25 is covered in this zone by a perpendicular inner body seal 112 on the column 11 (see FIGS. 4 and 5).

In the embodiment of the invention depicted in FIG. 3, a closed sealing element 42 is applied on the outer edge of the latch mount. Upon installation of the mounting plate 3, this sealing element 42 also seals the mounting slot in the latch region. The advantage of this variant consists in that the sealing element 42 can also be made available through preassembly on the latch 4' in contrast to the relatively large door body. Otherwise, its mode of action is analogous to the exemplary embodiment of FIG. 2.

With the creation of a dry zone which completely surrounds the latch, there exists for the first time the possibility of disposing electrical contact points in this area without having to take expensive protective measures against moisture and dirt. These contact points may be used for wiring for forward electrical drive energy and/or electrical signals. The exemplary embodiments depicted in FIGS. 4 and 5 depict said electrical contact points only schematically. The present invention is not directed at the concrete formation of the electrical contact points, but to their disposition in the dry zone according to the invention between the B column (or the C column) and the front side of the vehicle door. When the door is properly closed, electrical contact points 90, 90', 92, 92' are functionally connected. If a function of an electrically driven assembly must also be available with the door open, electrical energy may be provided by a small storage battery.

FIGS. 4 and 4a depict another embodiment which includes an electrical contact arrangement. The motor vehicle door is equipped with a latch 4 and a sealing element 25, as described above in conjunction with FIGS. 1 and 2. Two electrical contact elements 90 in the door are connected with a conducting line 900 and are integrated in the latch 4. Associated with these contact elements 90 are two contact elements 92 on the column 11, which, when the door is closed, contact the sliding surfaces 91 in the mount 30, 30' and are thereby reliably guided into contact with the opposing contact elements 90. Spring elements 93 ensure that clearance tolerances are accommodated for and an adequately high contact pressure is achieved to keep electrical transfer resistance low. The conducting line 920 connects the contact elements 92 with a power supply source and/or an electronic controller (not shown). Elasticities in the vehicle body present no problem in the electrical contact since when they engage, the mechanical latch parts 4, 111 align the contact elements 90, 92 with each other.

FIGS. 5 and 5a depict an alternate embodiment to that described above according to FIG. 4 essentially through the direction of action of the spring-loaded contact elements 90'. Here, the springs 93 do not act orthogonally to the closing movement of the latch 4, but rather in the closing direction of the door. When the vehicle door is closed, the electrical contact elements 90' and 92 are in active connection with each other.

While a preferred embodiment of the invention has been illustrated and described, it should be understood that variations will be apparent to those skilled in the art. The depictions of the electrical contacts and connections are only representative. Depending on the requirements of the individual case, it is possible to integrate a number of energy and signal transmitting contact points in the dry zone of the latch 4 described. It is also possible to provide these contact points with prior art protective covers which offer protection from direct contact with other objects or sprayed water when the door is open. Accordingly, the invention is not to be limited to the specific embodiments illustrated and described, but should be determined by reference to the following claims.

The disclosure of the attached German Patent Application 196 22 310.5, filed on Jun. 4, 1996, is incorporated fully herein by reference. Priority of this German application is claimed.

We claim:

1. A motor vehicle door for a car body of a vehicle, the car body having a locking element, the door comprising:
   an outside door panel and an inside door panel having a large cutout;
   a mounting plate having thereon a plurality of functional units, for sealingly closing the large cutout on the inside door panel;
   a wet zone formed between the outside door panel and the inside door panel or the mounting plate, which adjoins a dry zone towards the inside of the vehicle;
   a latch, at a front end of the door, that can be brought into positive engagement with the locking element, the latch connected with at least one control unit and being preassembled on the side of the mounting plate facing the inside door panel;
   an indentation of the inside door panel directed into the wet zone, at least partially accommodating the latch; and
   a sealing element which seals at least a portion of the latch in a region on the front end of the door against moisture when the door is shut.

2. The motor vehicle door according to claim 1 wherein an edge of the mounting plate comprises a latch mount which covers a front end of the latch at least partially and has a cutout for engaging the locking element.

3. The motor vehicle door according to claim 2 wherein the latch mount of the mounting plate is connected in the immediate proximity of the latch by a plurality of connection elements to the front end of the inside door panel.

4. The motor vehicle door according to claim 1 wherein the connection elements between the latch and an inside door handle are installed exclusively in the dry zone.

5. The motor vehicle door according to claim 2 further comprising a latch assembly comprising the latch and the latch mount and a plurality of electrical contacts operatively connected to a plurality of functional electrical units on the mounting plate, the electrical contacts for interconnecting the functional electrical units and the car body of the vehicle when the door is shut for transmission of electrical energy and signals.

6. The motor vehicle door according to claim 5 wherein the electrical contacts are designed as separate parts.

7. The motor vehicle door according to claim 5 wherein further comprising a lock arrangement comprising the latch and the locking element, wherein the electrical contacts are components of the lock arrangement.

8. The motor vehicle door according to claim 1 wherein the sealing element runs essentially along the surrounding contour of the latch and presses against a column in the car body of the vehicle when the door is shut.

9. The motor vehicle door according to claim 1 wherein the sealing element runs essentially along the front end of the inside door panel on the outer contour of the indentation, and when the door is shut presses against a column in the car body of the vehicle and a door flange seal.

10. The motor vehicle door according to claim 1 wherein the sealing element runs essentially along the contour of the outside door panel.

11. A motor vehicle door for use in a motor vehicle comprising a locking element adjacent said door, the door comprising:

a front portion adjacent the locking element on such motor vehicle;

an outside door panel;

an inside door panel comprising a large cutout;

a mounting plate sealingly attached to the inside door panel over the large cutout, the mounting plate comprising a plurality of functional units;

a wet zone adjacent the outside door panel;

a dry zone adjacent an interior of such motor vehicle;

at least one control unit;

a latch for engaging the locking element of such motor vehicle, wherein the latch is preassembled and mounted to the mounting plate adjacent the inside door panel, and positioned on the front portion of the door, and wherein the latch is connected to the at least one control unit by at least one connection element;

a latch region comprising the latch;

an indentation which accommodates at least a portion of the latch; and a sealing element positioned adjacent the latch region for sealing at least a portion of the latch region against moisture when the door is shut.

12. The motor vehicle door according to claim 11 wherein the mounting plate comprises a latch mount for mounting the latch, wherein the latch mount covers at least a portion of the latch, and wherein the latch mount comprises a cutout portion for enabling engagement of the latch and the locking element.

13. The motor vehicle door according to claim 12 wherein the latch mount of the mounting plate is connected to a portion of the inside door panel adjacent the front portion of the door by a plurality of connection elements.

14. The motor vehicle door according to claim 11 wherein the at least one connection element between the latch and the at least one control unit is positioned in the dry zone.

15. The motor vehicle door according to claim 11 wherein the at least one control unit comprises an electrical contact attached to the latch which is connected to at least one of said plurality of functional units and wherein when the door is shut in such motor vehicle, the electrical contact is electrically connected to such motor vehicle for transmission of electricity.

16. The motor vehicle door according to claim 11 wherein the sealing element runs along a surrounding contour of the latch for pressing against a door frame column in such motor vehicle which is adjacent said door when said door is shut in such motor vehicle.

17. The motor vehicle door according to claim 11 wherein the sealing element runs along an outer contour of the indentation for pressing against a door frame column in such motor vehicle which is adjacent said door when said door is shut in such motor vehicle.

18. The motor vehicle door according to claim 11 wherein the sealing element runs along a contour of the outside door panel.

19. The motor vehicle door according to claim 11 wherein the at least one control unit comprises a door handle.

20. A motor vehicle door for use in a motor vehicle comprising:

an outer panel;

an inner panel adjacent the outer panel;

a mounting plate mounted to the inner panel with the inner panel between the mounting plate and the outer panel;

means for sealing a portion of said door adjacent an interior of such motor vehicle from external moisture, said portion comprising a dry zone;

a latch attached to the mounting plate and positioned in the dry zone; and wherein the means for sealing comprises a sealing element extending around the latch on the door.

21. The motor vehicle door of claim 20 wherein the inner panel comprises an indentation located in the dry zone, wherein the latch is positioned in the indentation and fixed to the inner panel.

* * * * *